June 23, 1959     E. E. COULTER     2,891,632
CYCLONE STEAM AND WATER SEPARATOR WITH WHIRL
CHAMBER CAGE IN MIXTURE INLET CHAMBER
Filed Oct. 27, 1955
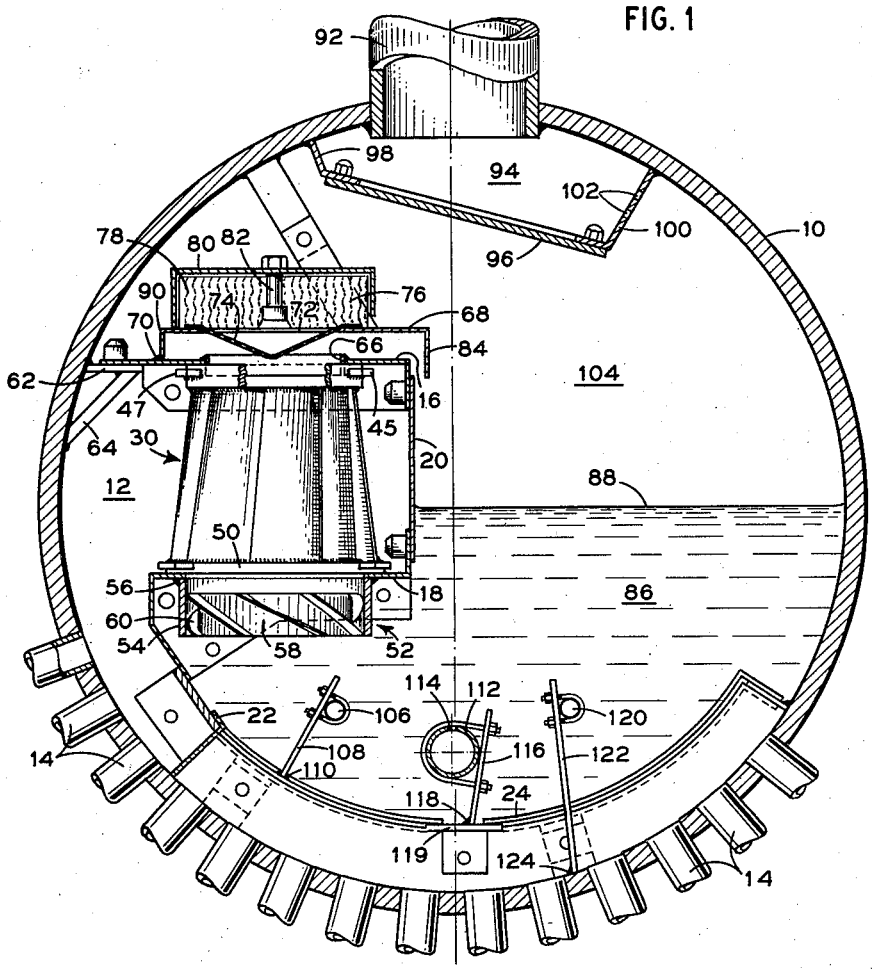
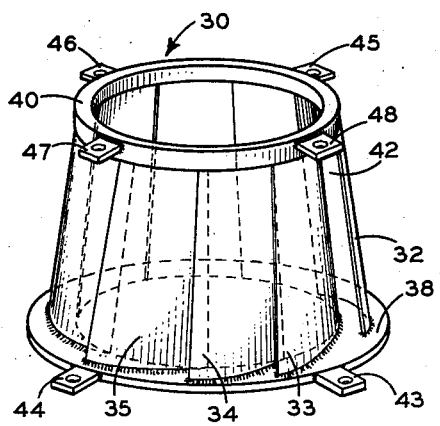
INVENTOR.
Earl E. Coulter
BY
ATTORNEY

United States Patent Office 2,891,632
Patented June 23, 1959

2,891,632
CYCLONE STEAM AND WATER SEPARATOR WITH WHIRL CHAMBER CAGE IN MIXTURE INLET CHAMBER

Earl E. Coulter, Alliance, Ohio, assignor to The Babcock & Wilcox Company, New York, N.Y., a corporation of New Jersey Application October 27, 1955, Serial No. 543,062

9 Claims. (Cl. 183—85)

This invention relates to improvements in cyclone steam and water separators.

The invention is more particularly concerned with a cyclone steam and water separator operating as a component of the steam and water separating drum of a high pressure and high capacity steam generator, the cyclone separator of the invention effectively separating steam from water at high pressures thus enhancing the use of natural circulation steam generators. The effective separation of steam and water by the separator of this invention functions to improve the density differences between the up-flow and the down-flow legs of such a natural circulation steam generator. It attains this result by an improved construction and arrangement of elements which provides increased separating capacity, lower space requirements and better performance of the pertinent type of separators by reducing the steam bubble separation time within the steam and mixture strata entering the cyclone separator whirl chamber; by rendering more uniform the flow of the entering mixtures within the cyclones, and by more uniform loading the annular separated water discharge outlet leading from the bottom of the cyclone.

For attaining the above indicated results the pertinent steam and water separator involves an arrangement of steam and water drum internals involving a steam and water mixture inlet chamber including a baffle shelf horizontally disposed within the steam water drum and overhanging the water space of the drum. This baffle shelf is provided with a plurality of large diameter circular openings in a row disposed longitudinally of the shelf and the steam and water drum. Supported upon this baffle plate in superposed position and centered relative to said openings are circular cages each of which is in the form of a hollow frustum of a cone. Each cage has an upper and lower ring integrally united with a ring of metallic vanes each of which has its leading, or inlet edge overlapping the following edge of an adjacent vane to provide therewith a radially narrow upright slot for the entrance of a thin stratum of steam and water mixture of high velocity, the strata entering the whirl chamber formed by the circular cage to set up a whirling motion therein. The pertinent part of the steam and water mixture inlet chamber also includes a fixed top plate extending longitudinally of the drum and having formed therein circular exit openings for separated steam, centered with respect to the circular openings in the bottom plate or shelf. The top plate is fixed with reference to the drum and the remainder of the plates forming the steam and water inlet chamber around the circular cages are disposed in their operating positions as above indicated, the top plate as well as the bottom plate preferably having centering lugs disposed about the centered openings and co-acting with other lugs upon the cages to center the cages within the pertinent part of the steam and water inlet chamber. Preferably, the top plate has superposed thereon a scrubber shelf construction in the form of a metallic channel with a row of openings therein corresponding in number to the number of cages and centered therewith. This channel has downwardly extending flanges and other supports through which it is supported by the top plate and the channel construction overhangs the steam water mixture inlet chamber toward the center of the drum to provide auxiliary openings for the efflux of any water particles which may be separated from the steam in a position immediately above the whirl centers. At this overhanging position the channel has preferably a downwardly extended flange spaced from an upright wall of the pertinent part of the steam water inlet chamber. This wall is preferably formed by one or more plates connected to and closing the opening between the top and bottom plates. Secured to the scrubber shelf in its openings are a plurality of perforated pyramidal caps constructed of perforated metal and arranged in inverted pyramidal or conical form for acting as auxiliary steam and water separators at positions above the whirl chambers, and superposed with respect to the caps are a plurality of scrubbers each aligned with one of the whirl chamber cages and including a plurality of closely spaced and vertically disposed metallic plates. Secured to the bottom plate at the circular openings therein are a plurality of whirl chamber water outlet constructions each including a central element in the form of an inverted basin spaced radially inwardly of a hollow cylindrical plate metal ring with the basin secured to the ring by plurality of helical vanes.

Cyclone steam and water separators of the type involved in this invention are used to separate 4 to 40 times as much water as steam. Their primary purpose is to separate bubbles of steam from water. This type of separator is used to improve on natural separation and has two advantages. The first advantage, is that the centrifugal force field amplifies the density difference between steam and water, thereby amplifying the separating force. The second advantage, is the fact that the inlet nozzles of the cyclone separators slice the mixture into relatively thin layers. Therefore, a steam bubble has to travel only a few inches through water before it is separated. One advantage of multiple vanes in such separators follows from the fact that for a given total inlet area the thickness of the mixture layer is inversely proportional to the number of inlets.

In the pertinent type of cyclone separators, the direction of the drag force on a bubble of steam in water is radially outward, which is the reverse of a moisture or dust separator. In a dust separator for instance the dust particles, being heavier than the gas, tend to be drawn radially outwardly and the drag force on the dust particles exerted by the frictional resistance of the air to their outward movement is radially inward. The drag force in applicant's separator may be represented as follows:

$$F_d l = K_1 l^2 p_e C U^2$$

where $F_d l$ = drag force
$l$ = bubble radius
$C$ = drag coefficient
$U$ = relative velocity between steam bubble and water in a radial direction
$p_e$ = water density, and $K_1$ is a constant the value of which depends on the units used for the other terms The separating force, which is exerted inwardly is as follows:

$$F_s l = K_2 l^3 (p_e - p_g) W^2 R$$

where $F_s l$ = separating force
$l$ = the bubble radius
$W$ = angular velocity of the vortex
$R$ = distance of particle from center of vortex
$p_e$ = water density
$p_g$ = density of the gas, and $K_2$ is a constant the value of which depends on the units used for the other terms.

In separators of the type of this invention, the water does not discharge from the center of the cyclone, but remains along the cyclone, or whirl chamber, wall and discharges axially. Therefore, it is only necessary for a steam bubble to move to the surface of the relatively thin mixture layer to be separated. Any size bubble can be separated if enough time is provided. In other words, even extremely small steam bubbles can be separated if they are given sufficient time to reach the surface of the mixture layer before being discharged from the bottom annulus. Thus, separation time is of utmost importance in this type of separator. These considerations, again, show the importance of holding the thickness of the mixture layer, and thus the separating time, to a minimum by using multiple inlets.

The multiple inlets also provide smoother, more symmetrical operation in this type of separator. This is important in using the bottom annulus to the best advantage, because all parts of the annulus are loaded equally.

The steam water separators of the invention effectively separate steam from water even with boiler water concentrations as high as 10,000 p.p.m. In their operation the centrifugal force field amplifies the density differential between the steam and water, thereby amplifying the separating force. The uniformally distributed inlet nozzles slice the incoming steam and water mixtures in thin layers of the order of $5/16''$ or less. Therefore, the steam bubbles have to travel only a small distance through the water before they are separated therefrom.

Invention is set forth in a concise manner in the claims appended hereto, but for a more complete understanding of the invention, its uses, and operating advantages, recourse should be had to the following description which refers to an accompanying drawing in which a preferred embodiment of the invention has been illustrated.

In the drawing:

Figure 1 is a transverse section of a steam and water drum of a water tube steam generator having drum internals incorporating the invention; and Figure 2 is a perspective view of one of the whirl chamber cages involved in the invention.

In the drawings, Figure 1 illustrates a steam and water drum 10 preferably involved as a component of a high pressure steam generator such as that shown in the Patent 2,293,040. Within the drum there is a steam and water mixture inlet chamber 12 preferably formed by a plurality of plates and a part of the interior wall of the drum. This chamber has communicating therewith the outlet ends of a plurality of steam generating tubes 14 which normally discharge steam and water mixtures at high velocity into the chamber. The plates forming the chamber include the horizontal disposed top and bottom plates 16 and 18, the side plates 20, other arcuate plates 22, 24 and appropriate end plates near the ends of the drum, all acting to form the steam and water mixture receiving chamber in the upper part of which is disposed a row of circular and multiple vaned whirl chamber cages one of which is indicated in the Fig. 2 perspective view at 30. Each whirl cage has a unitary ring of metallic vanes such as those indicated at 32 and 35. The vanes are fixed integrally to a bottom ring 38 and a top ring 40 having the centering lugs 43–47. The vanes have their inlet (or leading) edges disposed outwardly radially from adjacent vanes to provide the narrow or thin steam water mixture slots or inlets 42, with each inlet normally conducting high velocity layer or stratum of steam and water into the whirl chamber within the circular cage.

It will be understood that there is a row of the Fig. 2 whirl chamber cages disposed preferably throughout the major part of the length of the drum. Each whirl chamber cage 30 is superposed with reference to a circular opening 50 in the bottom plate 18 with the lugs such as 44 and 43 co-acting with spaced lugs secured to the plate 18 to center the cage with respect to its separated water opening 50. Each cage may be bolted through the centering lugs to the bottom plate 18.

Below each whirl chamber cage is an annular separated water outlet construction generally indicated at 52. This construction involves a hollow cylindrical metallic ring 54 preferably welded to the lower surface of the plate 18 as indicated at 56. It also involves a circular center part in a form of an inverted basin 58 secured to the ring 54 by the helical vanes 60 disposed in the annulus between the center part 58 and the ring 54.

After the whirl chamber cages are disposed as indicated the top plate 16 is secured to appropriate supports such as 62 and 64 with its integrally united center ring 66 aligned with the opening in the top of the cage 30 and the centering lugs 45 and 47 disposed between co-acting lugs secured to the plate 16 or with the centering lugs secured to the plate 16 by screw threaded elements. Then the scrubber plate construction 68 is disposed above the top plate 16 and secured thereto in the position indicated in Fig. 1. Such securement may be effected by such welds as those indicated at 70. This scrubber plate construction has a series of circular openings 72 spaced therealong to be centered with respect to the whirl chamber cages and the separated steam outlet openings provided by the rings 66. Disposed within each circular opening in the scrubber plate 68 is a perforated pyramidal or conical metallic plate 74 which may be considered as an auxiliary separator. Each is preferably conical with a low ratio of apex height to diameter.

Fixed to the scrubber plate 68 above the perforated pyramids or baffles 74 are scrubbers 76. There is one scrubber for each whirl chamber cage, each scrubber consisting of a plurality of upright and closely spaced corrugated plates 78 secured together as an integral unit and held therein and held to the scrubber plate 68 by an inverted channel 80 through which passes a stud bolt 82 to secure the scrubber to the scrubber plate 68. The main part of the scrubber plate 68 is in the form of a metallic channel having the downwardly extending flange 84 spaced horizontally from the wall 20 toward the centerline of the drum as clearly shown in the drawing. This channel thus forms a cap for the whirl chamber separators and the relationship of the flange 84 to the wall 20 provides an opening from which any separated drops of water may exit from the separators and fall downward into the water 86. Along its opposite side, the channel of the scrubber plate 68 is a downwardly extending flange 90 contacting and welded to the top plate 16. At the ends of the steam and water separator construction, at positions preferably adjacent to the ends of the drum the scrubber plate construction 68 has downwardly extending end flanges internally united with the base of the channel and its downwardly extending flanges 84 and 90.

Each whirl chamber cage may be by way of example, about 8" in height and about 8" in inside diameter at the bottom of the cage. The individual vanes for each cage may have a developed width of about 4½" on their lower ends with a slightly smaller width at their tops. The longitudinally intermediate portion of each vane may be curved with a radius of about 4" with the curvature changing so that the curvature at the following edge of each vane is of the order of the 3½" radius. The leading edge of each vane may have a curvature of the order of 4" radius and this construction affords narrow upright entrance slots or passages for the high velocity streams of steam and water mixtures entering the whirl chamber. These slots or passages may have a width of about $1/16$ of an inch at their upper ends and $5/16$ of an inch at their lower ends, thereby providing thin slices or strata of high velocity entering streams, to thereby reduce the time required for steam bubbles to pass through the incoming streams.

Leading from the top of the drum are one or more steam off-take conduits 92 secured thereto in pressure tight relationship. For additional steam water separation these steam off-take conduits lead from an off-take chamber 94 provided by a bottom plate 96, side plate 98, and another side plate 100 having perforations or openings 102 therein for the passage of steam from the drum steam space 104 to the conduit 92.

Secured within the water space of the drum is the continuous blowdown line 106 held by brackets 108 which may be welded to the plates forming the inner wall of the mixture inlet chamber, as indicated at 110.

Also disposed within the water space of the drum 10 is a feed water pipe 112 having openings 114 for the distribution of feedwater as it enters the water space of the drum. This feedwater pipe 112 is held in position by brackets 116 welded as indicated at 118 to plates or brackets 119 forming a part of the mixture inlet chamber.

The chemical feed pipe 120 is held in position within the water space of the drum by brackets 122 which may extend from the wall of the mixture inlet chamber to contact with the drum wall where they are welded to that wall as indicated at 124.

In the operation of the illustrative steam and water separator, mixtures of steam and water exit from the risers or steam generating tubes 14 and pass into the inlet chamber 12 at high velocities. The high pressure mixtures pass in thin vertically elongated streams through and from the passages or slots 42 between the adjacent vanes of the whirl chamber cages and set up high velocity whirling action within the whirl chambers. This action results in such centrifugal force that the water is concentrated in a rapidly whirling stream near the perimeter of the whirl chamber, the steam bubbles passing from the water toward the center of the whirl chamber from which they pass upwardly through the rings 66, then through the cone or pyramid 74, then between the corrugated plates of the scrubber 76, and then into the drum steam space 104 from which the steam passes into the off-take chamber 94 to the drum steam off-take conduits 92.

The steam and water separator construction not only reduces the amount of metal required for optimum steam and water separation within a drum of a certain volume, but it has such a compactness characteristic that the overall steam water separating efficiency is markedly increased. This compactness, resides in the whirl chamber cages and their relationship to the steam and water mixture inlet chamber and it provides for increased separating capacity in a drum of a certain length and diameter, thereby increasing the steam water separating capacity of the drum and, in turn, substantially decreasing the number of whirl chambers provided in a drum of a certain length.

The drag force (the force acting counter to the steam separating force) of the separator shown and described is represented by the following formula:

$$F_d l = K_1 l^2 p_e C U^2$$

where:

$F_d l$ = drag force
$l$ = steam bubble radius
$C$ = drag coefficient
$U$ = relative velocity between steam bubble and water in a radial direction
$p_e$ = water density, and
$K_1$ = a constant the value of which depends on the units used for the other terms.

Similarly, the separating force which is exerted inwardly is as follows:

$$F_s l = K_2 l^3 (p_e - p_g) W^2 R$$

where:

$F_s l$ = separating force
$l$ = bubble (steam) radius
$p_e$ = water density $p_g$ = steam density
$W$ = angular velocity of the vortex of the fluid in the whirl chamber
$R$ = distance of steam bubble from the center of the vortex, and
$K_2$ = is a constant the value of which depends on the units used for the other terms.

Whereas the invention has been described with reference to the particular construction details and the relative arrangement of parts of a preferred embodiment it is to be appreciated that the invention is not limited to all of the details of that embodiment. The invention is rather to be considered as of such a scope that it may be used with variations of many of the structural details, within the scope of the subjoined claims.

What is claimed is:

1. In a gas and liquid separator, means forming an exterior chamber having a liquid level separating a liquid space from a gas space, means forming a gas and liquid mixture receiving chamber separated from said liquid and gas spaces, said chamber being disposed interiorly of the exterior chamber and normally receiving high velocity and high pressure streams of a gas and liquid mixture, the receiving chamber having opposed and spaced walls, one of which has an opening above the liquid level for the exit of separated gas and the other having an opening below the liquid level for the exit of separated liquid, and a whirl chamber cage wholly disposed within said mixture receiving chamber, said cage having open ends, which is aligned at one end with said liquid exit opening and aligned at its other end with said gas exit opening, said cage consisting wholly perimetrically of a plurality of segmental vanes, each spaced at its edge from and overlapping an adjacent vane to form therewith a plurality of gas and liquid inlet passages distributed entirely around the whirl chamber within the cage, and means holding the vanes in their operative positions, said passages being adapted to create a whirling action in one direction, and means disposed adjacent the opening below the liquid level for oppositely whirling and discharging the separated liquid therefrom.

2. The combination of claim 1 further characterized by a separated gas off-take and a separated liquid outlet from the exterior chamber.

3. The combination of claim 2 further characterized by a steam and water drum forming the exterior chamber, and an auxiliary steam and water separator beyond the gas exit opening, the drum normally having a water level intermediate the gas exit and liquid exit openings.

4. In a steam and water separator, a drum normally having a water level separating a water space from a steam space, means providing a steam and water mixture inlet chamber separated from said water and steam spaces within the drum, said means including a part of the drum wall, means normally providing for the entry in the chamber of streams of high velocity steam and water mixtures at a high pressure, the chamber having at one portion thereof parallel top and bottom members spaced substantially in a vertical direction with the bottom member below the normal drum water level and the top member above the normal water level, said top and bottom members extending longitudinally of the drum and throughout a substantial portion of its length, the bottom member having an opening for the downward exit of separated water, the top member having an opening for the upward movement of separated steam, the top opening being vertically aligned with the bottom opening, a whirl chamber disposed between the top member and bottom member and centered in alignment with said openings, said whirl chamber including a plurality of spaced overlying vanes forming a cage of circular cross section, said vanes forming inlet passages for inducing a whirling action in one direction to said mixture, auxiliary steam and water separating means above the top member and aligned with the opening in the top member, a whirl chamber bottom construction secured to said bottom member and forming an annular outlet for downwardly moving separated water, said water outlet construction including a centrally disposed basin member within a hollow cylindrical ring spaced radially outwardly of the bottom member with the bottom member secured to the ring by a plurality of helical vanes said vanes imparting an opposite whirl to the separated water to discharge the same and, the separated steam passing from the top of the whirl chamber to the steam space of the drum.

5. In a gas and liquid separator, means presenting an exterior gas and liquid holder having a liquid level separating a liquid space from a gas space, wall means providing a gas and liquid mixture inlet chamber within the holder separating said inlet chamber from said liquid and gas spaces, said wall means including a part of said holder wall, means normally provided for the entry into the holder of streams of high velocity gas and liquid mixtures at high pressure, the mixture inlet chamber having at the exit portion thereof parallel top and bottom members spaced substantially in a vertical direction with the bottom member below the normal liquid level and the top member above the normal liquid level, said top and bottom members extending longitudinally of the holder and throughout a substantial portion of its length, the bottom member having an opening for the downward exit of separated liquid, the top member having an opening for the upward movement of separated gas, the top opening being vertically aligned with the bottom opening, a whirl chamber having open ends disposed between the top and bottom members, the open ends of said whirl chamber being centered in alignment with said opening in the top and bottom members, said whirl chamber including a plurality of spaced overlying vanes forming a cage of circular cross-section, said vanes forming inlet passages for inducing a whirling action in one direction to said mixture, auxiliary gas and liquid separating means above the top member and aligned with the opening in the top member, a whirl chamber bottom construction secured to said bottom member and forming an annular outlet for downwardly moving separated liquid, said liquid outlet construction including a centrally disposed bottom piece within a hollow cylindrical ring spaced radially outwardly of the bottom piece with the bottom piece secured to the ring by a plurality of helical vanes, said helical vanes imparting a whirling action to the discharging separated liquid in a direction opposite to the whirl imparted by said cage vanes, and the separated gas passing from the top of the separator to the gas space of the holder.

6. For use in a vapor generator, a drum normally having a liquid level separating a vapor space from a liquid space, means within said drum forming a chamber partitioned from said vapor space and liquid space for normally receiving a high velocity and high pressure liquid-vapor mixture, and separating means wholly disposed in said liquid-vapor chamber forming a whirl chamber having a plurality of transversely extending inlet, whirl inducing, passageways circumferentially spaced about the entire periphery of said whirl chamber for receiving and separating said liquid-vapor mixture into its respective liquid and vapor constituent parts, and said separating means having an opening disposed below the liquid level for discharging said separated liquid into the liquid space and a second opening above the liquid level for discharging the separated vapor into said vapor space.

7. For use in a vapor generator, a drum normally having a liquid level separating a vapor space from a liquid space, means within said drum forming a chamber separated from said vapor space and liquid space for normally receiving a high velocity and high pressure liquid-vapor mixture and separating means wholly disposed in said liquid-vapor chamber for separating said mixture into its constituent liquid and vapor parts, said separating means including a plurality of radially spaced vanes forming a frusto-conical whirl chamber cage, said vanes defining a plurality of transversely extending inlet whirl inducing passageways circumferentially spaced about the entire periphery of said frusto-conical whirl chamber cage for receiving and separating said liquid-vapor mixture into its respective liquid and vapor constituent parts, said whirl cage having an opening in the upper end thereof for discharging said separated vapor into the vapor space and a second opening disposed below the liquid level in the lower end thereof for discharging the separated liquid into said liquid space, and a liquid outlet construction adjacent said second opening, said construction including a plurality of helical vanes, said helical vanes imparting an opposite whirl to the separated liquid discharging into said liquid space below the liquid level.

8. For use in a vapor generator, a drum normally having a liquid level separating a vapor space from a liquid space, a baffle means within said drum spaced from a wall portion thereof and forming therewith a circumferentially extending chamber separated from said vapor space and liquid space for normally receiving a high velocity and high pressure liquid-vapor mixture, said chamber being substantially co-extensive the length of said drum, said chamber having a laterally extending upper portion thereof defined by spaced top and bottom plates substantially co-extensive therewith, said top and bottom plate having aligned openings therein, and separating means wholly disposed in the upper portion of said liquid-vapor chamber for separating said mixture into its constituent liquid and vapor parts, said separating means including a plurality of radially spaced vanes forming a frusto-conical whirl chamber cage disposed between said plates, said vanes defining a plurality of longitudinally extending inlet whirl inducing passageways circumferentially spaced about the entire periphery of said frusto-conical whirl chamber cage for receiving and dividing said liquid-vapor mixture into relatively thin strata of high velocity streams, said whirl cage having an opening in the upper end thereof in alignment with the opening in said top plate for discharging said separated vapor into the vapor space and a second opening disposed below the liquid level in the lower end thereof in alignment with the opening of said bottom plate discharging the separated liquid into said liquid space, an auxiliary separator disposed above the opening of the top plate and a liquid outlet construction adjacent said opening in the bottom plate, said construction including plurality of helical vanes, said helical vanes being adapted to impart an opposite whirl to the separated liquid discharging into said liquid space below the liquid level.

9. The invention as defined in claim 6 wherein said whirl chamber is frusto-conical and said whirl inducing passageways being defined by radially spaced vanes extending about the entire periphery of said whirl chamber.

References Cited in the file of this patent

UNITED STATES PATENTS

| | | |
|---|---|---|
| 1,663,597 | Hawley | Mar. 27, 1928 |
| 1,748,286 | Hawley | Feb. 25, 1930 |
| 1,753,972 | Schutz | Apr. 8, 1930 |
| 2,233,079 | Hawley | Feb. 25, 1941 |
| 2,321,628 | Rowand | June 15, 1943 |
| 2,346,672 | Fletcher | Apr. 18, 1944 |
| 2,434,663 | Letvin | Jan. 20, 1948 |
| 2,489,903 | Kraft et al. | Nov. 29, 1949 |